United States Patent [19]

Kay

[11] Patent Number: 4,575,658

[45] Date of Patent: Mar. 11, 1986

[54] POWER SUPPLY FOR A RING LASER

[75] Inventor: Robert M. Kay, Seminole, Fla.

[73] Assignee: Honeywell Inc., Minneapolis, Minn.

[21] Appl. No.: 564,802

[22] Filed: Dec. 23, 1983

[51] Int. Cl.⁴ .............................................. H01J 7/24
[52] U.S. Cl. ............................... 315/111.21; 315/171;
315/294; 307/318; 372/94
[58] Field of Search ................... 315/111.21, 168, 171,
315/176, 294, 295; 356/350; 372/33, 38, 94;
307/318

[56] References Cited

U.S. PATENT DOCUMENTS

| | | | |
|---|---|---|---|
| 2,310,743 | 2/1943 | Moss | 315/294 |
| 2,896,119 | 7/1959 | Milan-Kamski | 315/171 |
| 3,011,065 | 11/1961 | Carey | 307/318 |
| 3,238,417 | 3/1966 | Boksjo | 315/294 |
| 3,303,413 | 2/1967 | Warner et al. | 307/318 |
| 4,063,147 | 12/1977 | Hatanaka et al. | 307/318 |
| 4,282,495 | 8/1981 | Ljung | 372/94 |

Primary Examiner—Harold Dixon
Attorney, Agent, or Firm—Robert A. Pajak

[57] ABSTRACT

A power supply circuit is disclosed for a ring laser having a cathode and having first and second anodes so that the ionization current between the cathode and each of the anodes are substantially equal. According to the invention, a Zener diode is electrically connected in the path of one of the ionization currents. The Zener voltage magnitude of the Zener diode is selected so as to equalize the ionization currents.

3 Claims, 1 Drawing Figure

POWER SUPPLY FOR A RING LASER

BACKGROUND OF THE INVENTION

The Government has rights in this invention pursuant to Contract No. DASG60-81-C-0038 awarded by the Department of the Army.

This invention relates to ring laser angular rate sensors, sometimes referred to as ring laser gyros, and more particularly to a power supply circuit used to sustain the plasma within a ring laser.

Ring laser angular rate sensors are well known and are similar to those disclosed in U.S. Pat. No. 3,373,650 issued Mar. 19, 1968 to J. E. Killpatrick and U.S. Pat. No. 3,390,606 issued July 2, 1968 to T. J. Podgorski, both patents assigned to the assignee of the present application. According to the ring laser angular rate sensors described in these patents, there is included a triangular block which forms a triangular-shaped ring laser cavity defined by mirrors at the three corners thereof. The laser cavity itself is filled by gas which comprises, for example, helium and/or neon.

In order to establish counter-propagating laser beams, a common cathode operates in conjunction with two symmetrically placed anodes, which anodes must maintain a minimum current so as to electrically pump the laser resulting in a glow discharge or plasma. To assure that the necessary current and/or voltage is available at each of these two anodes, it is necessary to provide a sufficiently high voltage source for maintaining the electrical ionization currents between the cathode and each of the anodes so as to continuously establish the glow discharge or plasma.

Inherent in the ring laser angular rate sensor, there exists a bias in the rotational output signal which is a strong function of the difference in ionization currents between the electrodes and a weaker but significant function of the total discharge current, i.e. the sum of the two ionization currents. In order to obviate the problems of bias due to variations in total current and the differential current of the pair of ionization currents between the cathode and the two anodes, complex current regulators have been employed. One example is shown in U.S. Pat. No. 4,282,495 issued Aug. 4, 1981, to Bo H. G. Ljung. Such current regulators are complex and expensive to build. Furthermore, the circuitry requires an increased load to a regulated power supply which would be necessary to operate the circuitry.

BRIEF SUMMARY OF THE INVENTION

The present invention provides a power supply for a ring laser and specifically a ring laser angular rate sensor which is simple to build, inexpensive, and requires no additional power. The power supply of the present invention provides a means for equalizing the ionization currents normally associated with the two plasma paths of a ring laser employed in an angular rate sensor. Equalization of the ionization currents is accomplished by use of a low impedance voltage dropping element, such as a Zener diode, in the electrical path of at least one ionization current path.

DETAILED DESCRIPTION OF THE INVENTION

Figure 1:
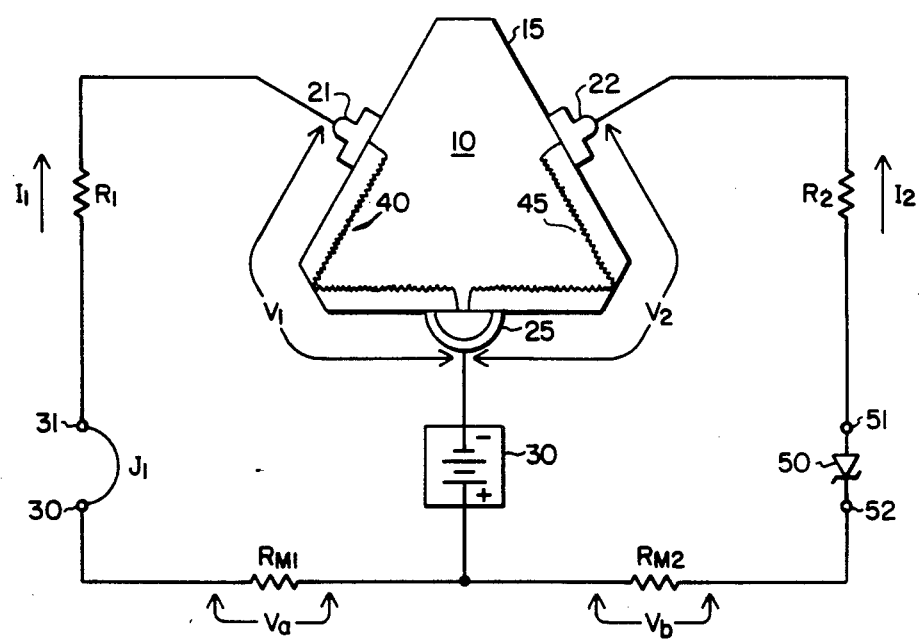
FIG. 1 is a schematic circuit diagram showing one embodiment of the invention.

FIG. 1 is a schematic block diagram of the invention of the present application. There shown is a ring laser angular rate sensor 10 similar to FIG. 1 of the above referred to U.S. Pat. No. 4,282,495. Ring laser 10 includes cavity 15 providing gas filled tunnels (not shown) between a first electrode 25 serving as a cathode and each of second and third electrodes, 21 and 22 respectively, serving as anodes. Cathode 25 is electrically connected to the negative side of a high voltage power supply 30. The positive side 32 of the high voltage supply 30 is electrically connected to anode 21 through resistors RM1, R1 and conductive shorting jumper J1 between nodes 30 and 31. This establishes a first current I1 from the positive side of supply 30 through resistance R1, RM1, and J1, and through the gas between anode 21 and cathode 25 thereby establishing plasma 40 in the tunnels of the cavity (not shown) of ring laser cavity 15 and a voltage V1 between anode 21 and cathode 25.

In a similar fashion the positive side 32 of supply 30 is electrically connected to anode 22 through resistors RM2 and R2 in series with a Zener diode 50 electrically connected between nodes 51 and 52. The anode of Zener diode 50 is electrically connected to anode 22 through resistor R2 and node 51, and the cathode thereof is electrically connected to the positive side 32 of supply 30 through resistor RM2 and node 52. This electrical path establishes a second ionization current I2 through the gas between anode 22 and cathode 25 thereby establishing plasma 45 in the tunnel of cavity 15 and a voltage V2 between anode 22 and cathode 25.

As is well known, by the virtue of the plasma paths 40 and 45, the closed-loop optical path, laser pump, and mirrors, a pair of counter-propagating laser beams is produced. Such a system may then provide a laser angular rate sensor or gyro.

In a practical embodiment of the present invention, power source 30 provides a high voltage power supply in the order of 1,000 volts. Resistors R1 and R2 are in the order of 800 K Ohm resistance values. With electrical ionization currents I1 and I2 in the order of 0.5 ma each anode-cathode voltage drops V1 and V2 are in the order of 600 V. Resistors RM1 and RM2 are in the order of 1K and are used for monitoring ionization currents I1 and I2 by measuring the voltages there across.

The ionization current paths through cavity 15 are unique for each cavity. The resulting anode to cathode voltage drop V1 and V2 corresponding to currents I1 and I2 are dependent upon many factors. These factors include, among others, the unique boring of the tunnels in each cavity, gas make-up, surface configuration of the electrodes, and ionization current value. In the present invention, a means is provided for allowing equal ionization currents driven by a common power supply and having equal current limiting resistances R1 and R2. For equal resistance values R1 and R2, and RM1 and RM2, and a common supply 30, the ionization currents I1 and I2 are usually unequal.

In the discussion which follows, it will be assumed that resistors R1 and R2 are a matched pair of resistors having substantially identical values and temperature coefficients. Similarly, resistors RM1 and RM2 are a matched pair of resistors. Furthermore, current flowing through current monitoring resistors RM1 and RM2 establish voltages VA and VB, respectively, relative to the positive side 32 of supply 30.

Consider now the operation of the circuit of FIG. 1 assuming a shorting jumper has been provided between nodes 51 and 52. Further assume that the voltage V1 is greater than V2. In this situation current I2 is greater than I1. In these circumstances a low impedance variable voltage source may be temporarily inserted between nodes 51 and 52 so as to apply a bucking voltage to the current flow from source 30. The low impedance source is placed in the circuit such that node 52 is positive with respect to 51 so that an increase in the bucking voltage will decrease the ionization current I2. The variable voltage source is then adjusted until the voltages VA and VB are equal which is indicative that the ionization current I1 and I2 are equal since RM1 is equal to RM2.

A Zener diode or a selected combination of Zener diodes and diodes may be substituted for diode 50 in the circuit of FIG. 1 to serve as a low impedance voltage dropping means like the variable voltage source. The Zener diode or combination thereof selected is one which will provide a voltage drop magnitude equivalent to the value of the variable voltage source which resulted in the equal ionization currents. Note that if voltage V2 was greater than V1, a Zener diode could then replace jumper J1, and J1 can then be placed between nodes 51 and 52.

In the above illustration, $V_B$ was initially greater than Va because anode-cathode voltage drop V1 was greater than the anode-cathode voltage drop V2 for equivalent resistance values R1 and R2 and a supply voltage 30. The resulting variable voltage source magnitude which establishes equal ionization currents I1 and I2 will therefore be equal to the difference between the anode-cathode voltages V1 and V2.

The power supply circuit of FIG. 1 including Zener diode 50 provides equal ionization currents and balance current paths which will result in a ring laser angular rate sensor having excellent bias stability. The power supply circuit as illustrated in FIG. 1 results in low bias sensitivity to changes in supply voltage or temperature changes affecting the laser cavity 15. This is so since the electrical paths of the ionization currents are balanced and the Zener diode offsets the difference in resultant anode-cathode voltages V1 and V2.

The embodiment shown in FIG. 1 of the present application has been illustrated with a sensor having a closed-loop path in the form of a triangle. However, the invention of the present application is not limited in scope to such closed-loop paths since the principles of the invention are applicable to any type of closed-loop path ring laser which provides an optical cavity for counter-propagating waves. Other paths include closed-loop paths having greater than 3 line segments such as a rectangle or pentagon.

Thus it will be appreciated that although specific embodiments of the invention have been shown and described herein, modifications may be made. Specifically, the Zener diode provides an equalizing means for passing electrical currents between nodes 51 and 52 thereby establishing a low impedance constant voltage drop across the nodes thereof. There are, of course, a variety of ways of providing an equalizing means than that described herein. Similarly, there are a variety of calibration techniques which may be implemented in establishing the value of the selected low impedance constant voltage drop which results in the establishment of the equal ionization currents. Resistors RM1 and RM2 have been provided for monitoring the ionization currents. This function may be provided by other techniques.

The embodiments of the invention in which an exclusive property or right is claimed are defined as follows:

1. A power supply circuit for a gas ring laser having first, second, and third electrodes for establishing an ionization current between said first electrode and each of said second and third electrodes so as to provide a plasma path through the gas between said first electrode and each of said second and third electrodes, aaid power supply circuit comprising:

a power supply having first and second output means for providing an output voltage therebetween, said first output means electrically connected to said first electrode;

a first impedance means electrically in series between said second electrode and said second power supply output means;

a second impedance means, substantially equivalent to said first impedance means, electrically in series between said third electrode and said second power supply output means; and zener-acting means for establishing a substantially constant voltage drop exhibiting a zener-voltage characteristic about a selected voltage magnitude between first and second terminating means thereof in the presence of an electrical current passing therethrough, said zener-acting means being electrically connected in series with a selected one of said first and second impedance means such that the current through said selected impedance means and through said electrode associated therewith, is greater than the other one of said impedance means in the absence of a voltage drop produced by said zener-acting means, said zener-acting means selected voltage magnitude being of a value for establishing substantially equal ionization currents passing through said second and third electrodes, respectively.

2. The apparatus of claim 1 wherein said zener-acting means includes at least one zener diode electrically in series between said first and second terminating means thereof.

3. A power supply circuit for a gas ring laser having first, second, and third electrodes for establishing an ionization current between said first electrode and each of said second and third electrodes so as to provide a plasma path through the gas between said first electrode and each of said second and third electrodes, said power supply circuit comprising:

a power supply having first and second output means for providing an output voltage therebetween, said first output means electrically connected to said first electrode;

a first impedance means electrically in series between said second electrode and said second power supply output means;

a second impedance means, substantially equivalent to said first impedance means, electrically in series between said third electrode and said second power supply output means; and a zener diode including at least one zener diode for establishing a substantially constant voltage drop exhibiting a zener-voltage characteristic about a selected voltage magnitude between first and second terminating means thereof in the presence of an electrical current passing therethrough, said zener diode being electrically connected in series with a selected one of said first and second impedance means such that the current through said selected impedance means is greater than the other one of said impedance means in the absence of said zener diode, said zener diode having a zener breakdown voltage magnitude of a value for establishing substantially equal ionization currents passing through said second and third electrodes.

* * * * *